May 14, 1963     A. C. HADANCOURT ET AL     3,089,983
IONIZATION CHAMBERS OF PLASMA GENERATORS AT HIGH TEMPERATURES
Filed Aug. 9, 1960     3 Sheets-Sheet 1
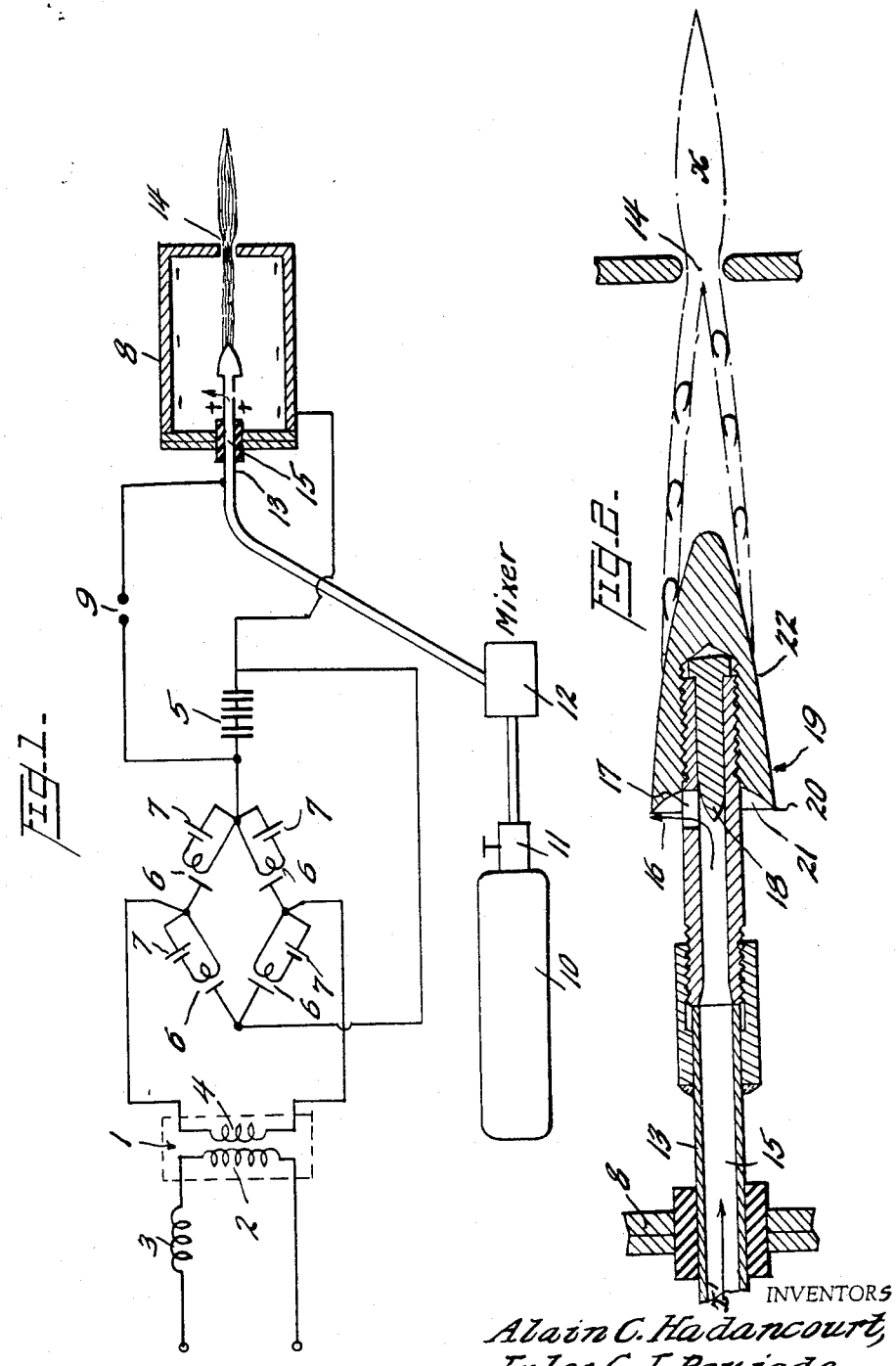
INVENTORS
Alain C. Hadancourt,
Jules C. J. Poujade
BY Watson, Cole, Grindle + Watson
ATTORNEYS

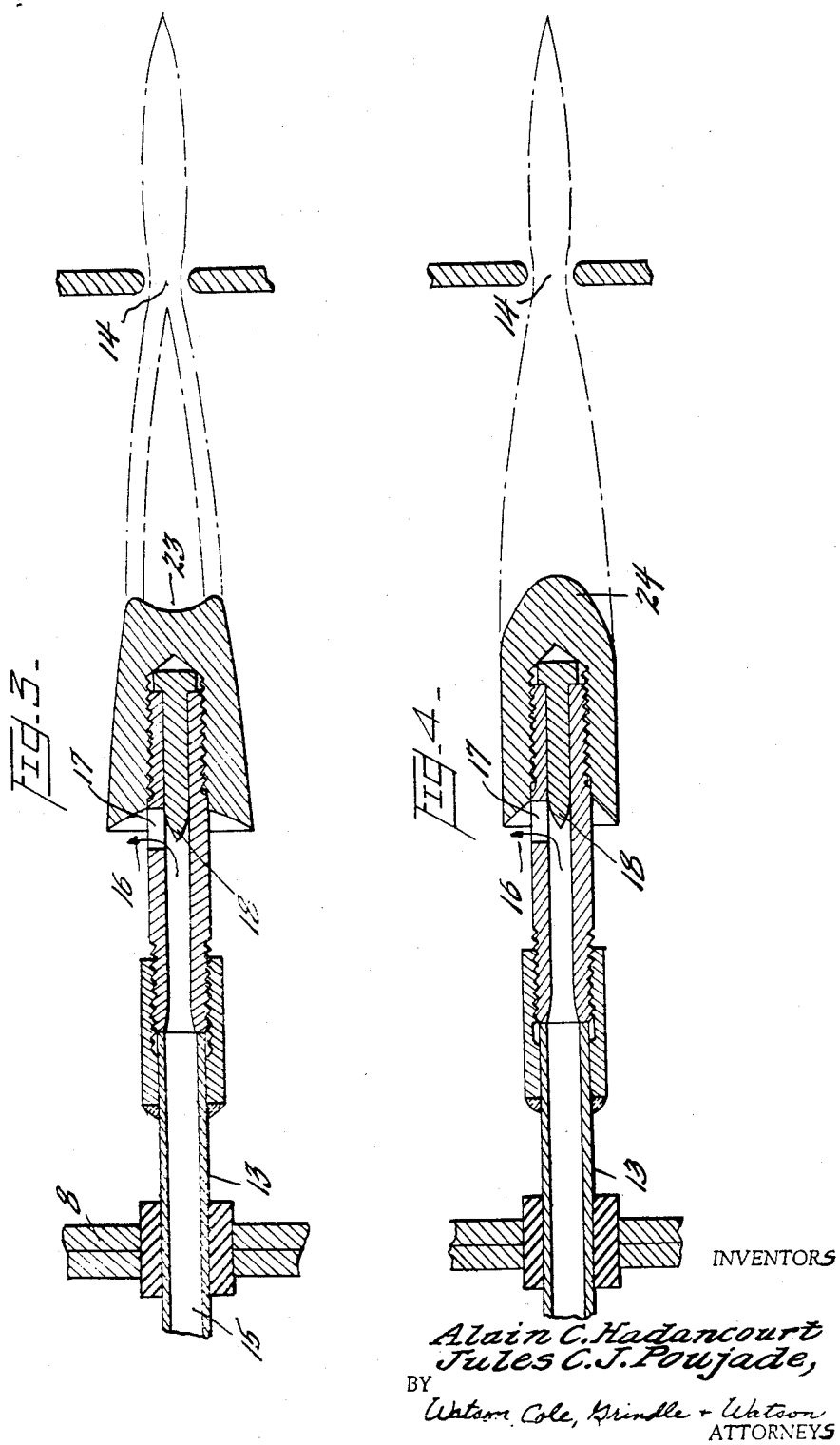

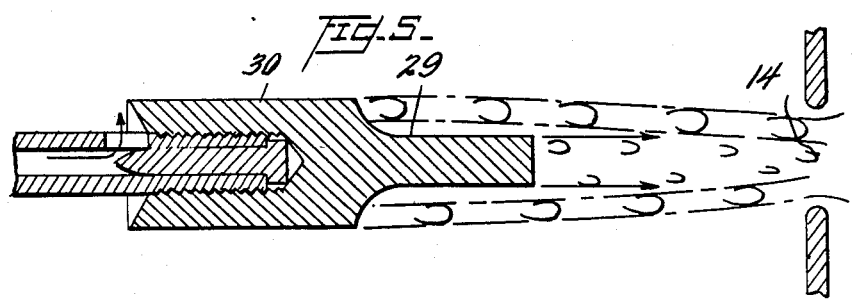
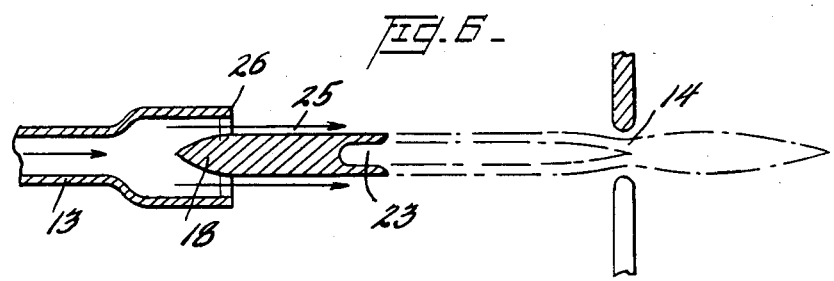
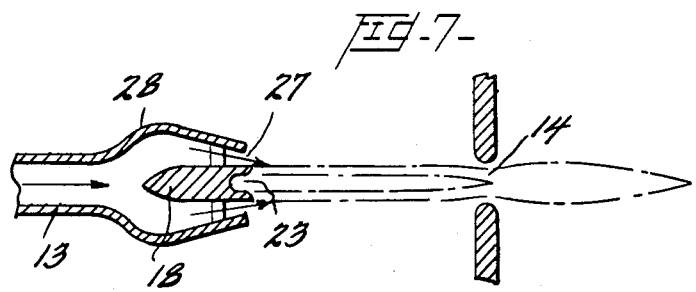
INVENTORS
Alain C. Hadancourt
Jules C. J. Poujade,
BY Watson, Cole, Grindle & Watson
ATTORNEYS

United States Patent Office 3,089,983
Patented May 14, 1963

3,089,983
IONIZATION CHAMBERS OF PLASMA GENERATORS AT HIGH TEMPERATURES
Alain Camille Hadancourt, Saint-Maurice, France, and Jules Cyprien Joseph Poujade, deceased, late of Melun, France, by Anne Marie Louise Poujade, nee Delmon, legal heir, Salviac, Lot, France, assignors to Societe Nationale d'Etude et de Construction de Moteurs d'Aviation, Paris, France, a company of France
Filed Aug. 9, 1960, Ser. No. 48,507
Claims priority, application France, Aug. 11, 1959
11 Claims. (Cl. 315—111)

It is known that a gas subjected to a sufficiently intense electric field is ionized and becomes the centre of a flux of electrons proceeding from the cathode to the anode, and of a flux of ions in the opposite direction. This double flux causes the ionization by collision of other atoms of the gas. The mixture of the neutral atoms, ions and electrons produced constitutes the plasma. The kinetic energy acquired in the electric field by the charged particles is transformed during the course of the collisions into thermal energy.

When the pressure of the gas increases, the frequency of the collisions of the particles increases and tends to equalize their mean kinetic energy (thermal equilibrium). In practice, the increase of pressure is obtained by the actual passage of the intense electric current through the plasma, which current takes the form of a conductive cylindrical layer. The centripetal magnetic pressure which results produces a pinch effect on the plasma, reducing its transverse dimensions. There is thus obtained a high value of internal energy of the gas and a very high thermal insulation, since the magnetic compression detaches the gas from the walls. In addition, this magnetic compression of the plasma increases its temperature and makes it possible for it to pass out of the ionization chamber in the form of a rapid jet, thereby providing a number of industrial applications either known or contemplated.

The intense electric current passing through the plasma creates a transverse magnetic field which superimposes its action on the longitudinal electric field produced by the electrodes. The intensity of this circumferential magnetic field varies abruptly from 0 to several multiples of 100,000 gauss across the ionized layer from the interior towards the exterior. As this layer is very thin (a few hundredths of a millimeter), there results a discontinuity of the field which generates an impulse wave concentric with the axis of the plasma. On the wave front, the pressure, the temperature and the kinetic energy abruptly increase. A fraction of the energy liberated by the electric discharge is absorbed by the outer surface of the layer and ensures the propagation of the wave front.

The ionization chambers of plasma generators (which are generally of cylindrical form) each comprise a cathode partially constituting the wall of the said chamber and through which is formed an opening for the outlet of the jet of plasma, and an anode mounted on the axis of this outlet opening.

The present invention relates to improvements made in such an ionization chamber with the object of improving its operation. It has the more particular object of providing electrodes for ionization chambers which permit a uniform production of plasma at very high temperatures.

In accordance with one of the improvements of the present invention, the anode, which is hollow in order to permit the axial intake of gas, comprises one or a number of nozzles formed, not on the axis of the anode, but symmetrically around the said axis and in a withdrawn position with respect to the head or free extremity of the anode, which enables an injection of gas to be obtained at the exterior of the electro-magnetic field.

In one form of embodiment of such an anode, the nozzles are directed transversely and are preferably located at the rear of a step formed on the head of the anode, the sharp edge of which enables the exit angle of the gas to be controlled.

In accordance with an alternative form of embodiment, the injection may also be effected in a longitudinal direction parallel to the axis, along the head of the anode, or again in a direction inclined towards the axis. In both these cases, the nozzle will preferably be annular and will be located around the head of the anode.

The profile of this head determines the distribution of the electric field which, in its turn, superposed on the flow in its wake, determines the surface of the impulse wave at the moment of its initiation. The arrangement of the injection nozzle or nozzles set back with respect to the anode head, enables the profile of this head to be chosen freely and thus the structure of the flow and that of the field can be formed independently.

In particular, the anode head can be given a tapering or ogival shape, or again it may have the form of a crater or a nipple.

The description which follows below with reference to the accompanying drawings (which are given by way of example only and not in any sense by way of limitation) will make it quite clear how the invention may be carried into effect, the special features which are brought out either in the text or in the drawings, being understood to form a part of the said invention.

FIG. 1 is a diagram of a plasma generator, given by way of explanation.

FIG. 2 is a longitudinal cross-section to a larger scale of one form of construction of an anode in accordance with the invention.

FIGS. 3 to 7 are similar views illustrating different alternative forms.

The diagram of FIG. 1 shows a transformer 1 which comprises a primary 2 supplied at a voltage of 220 or 380 volts, single-phase 50 cycles, variable by a magnetic core 3. The secondary 4, which is the seat of a difference of R.M.S. voltage which can vary according to requirements from 40,000 to 150,000 volts, is connected to two opposite corners of a rectifier bridge connection. The two other corners are connected to the armatures of a battery 5 of condensers. In the arms of the bridge are inserted kenotrons 6 provided with their heating elements 7. The rectified electric current stores electrical energy in the condensers; this energy is discharged into an ionization chamber 8 at each half-wave of the primary current. The discharge voltage is regulated by a spark device 9 with a variable air-gap.

A gas stored under pressure in a cylinder 10 flows through an adjustable relief valve 11 and passes into a mixer 12 in which powders may eventually be introduced in the case of the utilization of the plasma in the production of protective coatings. The gas finally reaches the hollow anode 13 which is electrically insulated. It is ionized in the chamber 8, the walls of which constitute the cathode. The gas is then converted to plasma which is compressed and ejected to the exterior through the orifice 14 for various subsequent utilizations.

The design of the ionization chamber (shape of the electrodes and of the gas flow) which determines the initial state of the discharge and therefore the form of the impulse wave, must be closely adapted to the electrical characteristics of the whole of the discharge circuit, in order to ensure the formation and the progression of the impulse wave up to the axis. As the wave front must be constituted by a surface of revolution coaxial with this axis, the kinetic energy of the elements of the plasma located on the downstream side is converted into heat when the impulse wave reaches the axis, and this further increases the temperature. It is essential to combine the flow of the gas and the distribution in space of the electro-magnetic field in order to obtain initial conditions such that the discharge begins on a layer comprised between two surfaces of revolution having a common axis which is that of the ejection orifice of the plasma.

The fluid flows through two nozzles in the form of discharge orifices; on the one hand, the anode nozzle which expands the gas into the ionization chamber and on the other hand the exhaust nozzle 14 which expands the plasma passing from the chamber to the external atmosphere.

The anode constructed in accordance with the present invention complies with these requirements. It is hollow and comprises an axial passage 15 for the intake of gas (see particularly FIG. 2). This passage opens into ports 17 which are directed transversely and are symmetrically distributed around the axis of revolution $x'$—$x$. The gas passes out in the direction of the arrow 16, a cone 18 for the uniform distribution of the gas flow ensuring the stability of the phenomenon and the reduction of pressure losses which are due to the change in direction of the flow.

The anode is provided with a head 19 of a material selected according to the application considered. At the rear, this head forms a step inclined towards the upstream side and enabling the exit angle to be controlled by means of its edge 20, depending on the nature of the gases and their speed of flow. This step may be continuous and form a surface of revolution or it may be discontinuous and preferably uniformly distributed along the circumference (three elements at 120°, for example). The dead zone of the re-entrant angle 21 is particularly effective in such a control.

In the example of FIG. 2, the anode head has an aerodynamic profile 22. Its wake reaches its maximum effectiveness when the downstream flow, prior to the discharge, is in the condition of alternate vortices, which is more favourable than the other conditions of flow for the forms desired.

The alternative form shown in FIG. 3 is essentially distinguished from the previous embodiment in that the anode head is formed at its extremity in the shape of a crater 23, while the profile of the head shown in FIG. 4 is ovoid or in the form of an ogive 24.

Experience has shown that a tapered profile 22 (FIG. 2) or an ogival profile 24 (FIG. 4) produces alternate outgoing vortices in the conditions of flow of the chamber. The exact form of this profile will depend furthermore on the nature of the gas utilized and the rates of flow desired. The Reynolds number in particular should be approximately between 50 and 2,500.

The nipple form of anode shown in FIG. 5 also gives excellent results. The combination of the nipple 29 and the shoulder 30 permits the formation of two coaxial cylinders of alternating vortices on each side of the ionized layer.

In the forms of construction of anode which have been described above, the gas arriving through the axial passage of the hollow anode 13 is injected transversely into the ionization chamber through nozzles symmetrically distributed around the axis of the anode.

It is also possible to respect the condition of symmetrical injection by the use of an annular nozzle 26 (FIG. 6) surrounding the anode head and ensuring a longitudinal injection of the gas, in the direction of the arrow 25, parallel to the axis. In this case, the anode head may advantageously be provided at its extremities, on the one hand with a flow-distribution cone 18 and on the other hand with a crater 23.

The alternative form shown in FIG. 7 is similar to the preceding arrangement, with the exception that the injection of the gas is effected in a convergent direction towards the axis, as indicated by the arrow 27. In this way, the conditions imposed are satisfied, and in addition the constriction of the jet is initiated. In this case, the widened portion 28 of the hollow anode 13 and the distribution cone 18 form an annular discharge nozzle which gives an axipetal component to the flow.

The transverse dimensions of the ionization chamber (its diameter if it is cylindrical) should be large with respect to the diameter of the anode (at least 4 to 5 times). In addition, the distance between the free extremity of the anode and the outlet orifice of the chamber should be adapted to the shape and to the diameter of the anode in order that the path of the gases in the electric field may correspond to the conditions necessary for the formation of the cylindrical impulse wave. In particular, this distance will be less than the distance from the anode to the transverse walls of the chamber in order that the discharge does not normally begin at the axis.

The field intensity will be adapted to the specific mass of the gas under the conditions of injection and with the technological characteristics previously indicated. By way of example, for air, under conditions of pressure equal to 760 mm. of mercury and of temperature equal to 15° C., the electric field should be in the vicinity of 30,000 volts per centimeter with electrodes of the form described.

It will of course be understood that modifications may be made to the forms of embodiment which have just been described, in particular by the substitution of equivalent technical means, without thereby departing from the scope of the present invention.

In particular, the polarities of the electric circuit which applies tension to the ionization chamber are not absolutely essential for its operation, and it would be possible to reverse the connections shown in FIG. 1, the anode then becoming the cathode and vice-versa.

What we claim is:

1. An ionization chamber of a plasma generator for producing a jet, of the type comprising around an axis a first electrode constituting a portion of a wall of the chamber, an outlet opening for the jet of plasma formed through the first electrode, a second electrode projecting coaxially into said chamber opposite to said opening, passage means for conducting gas into the chamber, means for introducing gas into said passage means, and means including condenser discharge means for creating voltage impulses between both electrodes, in which the second electrode comprises a head portion protruding into the chamber and a body portion formed with an internal passage constituting the said passage means for conducting gas into the chamber, said passage having an axial rear portion and a front portion leading to outlet means of the second electrode, arranged symmetrically around the axis and opening into the chamber recessed with respect to the said head portion.

2. An ionization chamber as claimed in claim 1, in which the first electrode is a cathode and the second electrode is an anode, the means for creating voltage impulses between both electrodes including rectifier means, means for feeding the rectifier means with high voltage alternating current, the rectifier means having a positive terminal and a negative terminal connected through condenser means, means for connecting said anode to the positive terminal through a spark device, and means for connecting the cathode to the said negative terminal.

3. An ionization chamber as claimed in claim 1, in which the front portion of the internal passage of the second electrode is shaped to lead the gas in divergent directions and the outlet means have outlet ports, located at the rear of a step formed on the head portion, said step having an edge facing the said ports.

4. An ionization chamber as claimed in claim 3, in which the head portion of the second electrode is outlined in the form of a re-entrant angle upstream to the said edge and has an aerodynamic tapered profile downstream of the same.

5. An ionization chamber as claimed in claim 3, in which the head portion of the second electrode is outlined in the shape of a re-entrant angle upstream to the said edge and the extremity of the head portion is formed in the shape of a crater.

6. An ionization chamber as claimed in claim 3, in which the head portion of the second electrode is outlined in the shape of a re-entrant angle upstream to the said edge, and the extremity of the head portion is formed in the shape of an ogive.

7. An ionization chamber as claimed in claim 3, in which the head portion of the second electrode is outlined in the shape of a re-entrant angle upstream to the said edge, and has a nipple profile downstream to the same, said nipple profile comprising a cylindrical portion projecting from the edge, a re-entering shoulder at the end of the cylindrical portion and a nipple portion joining with the shoulder.

8. An ionization chamber as claimed in claim 1, in which the front portion of the internal passage of the second electrode and the outlet means thereof are of annular form and directed parallel to the axis, said outlet means having an annular outlet port located surrounding the head portion and recessed therein.

9. An ionization chamber as claimed in claim 8, in which the extremity of the head portion is formed in the shape of a crater.

10. An ionization chamber as claimed in claim 1, in which the front portion of the internal passage of the second electrode and the outlet means thereof are of annular form and inclined toward the axis, said outlet means having an annular outlet port located surrounding the head portion and recessed therein.

11. An ionization chamber as claimed in claim 1, in which the front portion of the internal passage of the second electrode is defined by a wall adapted to uniformly distribute the gas to the outlet means, the said wall including a tapered portion having an apex arranged coaxial with the rear portion of the internal passage and directed toward said rear portion.

References Cited in the file of this patent
UNITED STATES PATENTS

| | | |
|---|---|---|
| 2,525,938 | Peck | Oct. 17, 1950 |
| 2,956,195 | Luce | Oct. 11, 1960 |